US 11,880,001 B2

(12) United States Patent
Sadhu (10) Patent No.: US 11,880,001 B2
(45) Date of Patent: *Jan. 23, 2024

(54) RESONANT ILLUMINATION DRIVER IN AN OPTICAL DISTANCE MEASUREMENT SYSTEM

(71) Applicant: Texas Instruments Incorporated, Dallas, TX (US)

(72) Inventor: Subhash Chandra Venkata Sadhu, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 945 days.

This patent is subject to a terminal disclaimer.

(21) Appl. No.: 16/834,385

(22) Filed: Mar. 30, 2020

(65) Prior Publication Data
US 2020/0225323 A1    Jul. 16, 2020

Related U.S. Application Data

(63) Continuation of application No. 15/662,352, filed on Jul. 28, 2017, now Pat. No. 10,641,869.

(30) Foreign Application Priority Data

Jul. 29, 2016   (IN) .............................. 201641026036

(51) Int. Cl.
*G01S 7/48* (2006.01)
*G01S 7/484* (2006.01)
*G01S 7/4865* (2020.01)
*G01S 17/10* (2020.01)
*G01S 17/894* (2020.01)
*G01S 17/931* (2020.01)

(52) U.S. Cl.
CPC ............ *G01S 7/484* (2013.01); *G01S 7/4865* (2013.01); *G01S 17/10* (2013.01); *G01S 17/894* (2020.01); *G01S 17/931* (2020.01)

(58) Field of Classification Search
None
See application file for complete search history.

(56) References Cited

U.S. PATENT DOCUMENTS

| | | |
|---|---|---|
| 3,211,915 A | 10/1965 | Poehlman et al. |
| 5,387,850 A | 2/1995 | Bray et al. |
| 5,576,627 A | 11/1996 | McEwan |
| 5,771,159 A | 6/1998 | Sako et al. |

(Continued)

*Primary Examiner* — Hovhannes Baghdasaryan
(74) *Attorney, Agent, or Firm* — John R. Pessetto; Frank D. Cimino (57) ABSTRACT

An optical transmitting system for distance measuring includes a modulation signal generator, a light source, and an illumination driver coupled to the modulation signal generator and the light source. The modulation signal generator is configured to generate a modulation signal. The light source is configured to generate an optical waveform with amplitude modulation corresponding with the modulation signal. The illumination driver is configured to drive the light source. The illumination driver includes a switch and a switch driver. The switch is configured to switch between an on state and an off state to drive the light source. The switch driver is configured to drive the switch between the on and off states. The switch driver includes a first inductor and a capacitor in series with the first inductor and the switch.

11 Claims, 3 Drawing Sheets

(56) References Cited

U.S. PATENT DOCUMENTS

| | | |
|---|---|---|
| 6,369,772 B1 | 4/2002 | Forster |
| 2002/0060914 A1 | 5/2002 | Porter |
| 2002/0149414 A1 | 10/2002 | Glidden |
| 2002/0154287 A1* | 10/2002 | Bowers .................. G01S 17/36 356/5.1 |
| 2008/0019407 A1 | 1/2008 | Li et al. |
| 2015/0070205 A1* | 3/2015 | Chang .................. F21V 23/045 342/110 |
| 2015/0308949 A1 | 10/2015 | Sadhu |

* cited by examiner

RESONANT ILLUMINATION DRIVER IN AN OPTICAL DISTANCE MEASUREMENT SYSTEM

CROSS-REFERENCE TO RELATED APPLICATIONS

This continuation application claims priority to U.S. patent application Ser. No. 15/662,352, filed Jul. 28, 2017, which claims priority to Indian Provisional Patent Application No. 201641026036, filed Jul. 29, 2016, both of which are hereby incorporated herein by reference in their entirety.

BACKGROUND

Optical time of flight (TOF) systems generally use optical light signals to measure distances to objects based on the time of flight of the light signal to the target object and back to the system. For example, three-dimensional (3D) TOF camera systems work by measuring the distance to a target object by reflecting light off of one or more targets and analyzing the reflected light. More specifically, 3D TOF camera systems typically determine a time of flight (TOF) for the light pulse to travel from the light source (e.g., a laser or light emitting diode (LED)) to a target object and return by analyzing the phase shift between the reflected light signal and the transmitted light signal. The distance to the target object then may be determined. An entire scene is captured with each transmitted light pulse. These systems may be used in many applications including: geography, geology, geomorphology, seismology, transport, human-machine interfaces, machine vision, and remote sensing. For example, in transportation, automobiles may include 3D TOF camera systems to monitor the distance between the vehicle and other objects (e.g., another vehicle). The vehicle may utilize the distance determined by the 3D TOF camera system to, for example, determine whether the other object, such as another vehicle, is too close, and automatically apply braking.

SUMMARY

In accordance with at least one embodiment of the disclosure, an optical transmitting system for distance measuring includes a modulation signal generator, a light source, and an illumination driver coupled to the modulation signal generator and the light source. The modulation signal generator is configured to generate a modulation signal. The light source is configured to generate an optical waveform with amplitude modulation corresponding with the modulation signal. The illumination driver is configured to drive the light source. The illumination driver includes a switch and a switch driver. The switch is configured to switch between an on state and an off state to drive the light source. The switch driver is configured to drive the switch between the on and off states. The switch driver includes a first inductor and a capacitor in series with the first inductor and the switch.

Another illustrative embodiment is a resonant illumination driver that includes a first inductor, a second inductor in series with the first inductor, a capacitor in series with the first and second inductors, and a power transistor in series with the capacitor. The first inductor is configured to receive a drive current. The power transistor is configured to switch between an on state and an off state to drive a light source.

Yet another illustrative embodiment is a 3D TOF camera that includes a transmitter and a receiver. The transmitter is configured to generate an optical waveform with amplitude modulation corresponding with a frequency of a generated modulation signal. The transmitter includes an illumination driver configured to drive a light source that generates the optical waveform. The illumination driver includes a switch and a switch driver. The switch is configured to switch between an on state and an off state to drive the light source. The switch driver is configured to drive the switch between the on and off states. The switch driver includes a first inductor and a second inductor in a split configuration with the first inductor and a capacitor in series with the first and second inductors and the switch. The receiver is configured to receive the optical waveform reflected off of a target object and determine a distance to the target object based on a TOF from the transmitter to the target object and back to the receiver.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Optical TOF systems, such as 3D TOF cameras, point Light Detection and Ranging (LiDAR, LIDAR, lidar, LADAR), and scanning LIDAR, determine distances to various target objects utilizing the TOF of an optical signal (e.g., a light signal) to the target object and its reflection off a target object back to the TOF system (return signal). These systems can be used in many applications including: geography, geology, geomorphology, seismology, transport, and remote sensing. For example, in transportation, automobiles can include 3D cameras to monitor the distance between the vehicle and other objects (e.g., another vehicle). The vehicle can utilize the distance determined by the 3D camera to, for example, determine whether the other object, such as another vehicle, is too close, and automatically apply braking.

The optical signals are generated by a light source (e.g., a laser diode, light emitting diode, etc.) driven by an illumination driver. In order to generate amplitude modulated optical signals, which are utilized in many optical TOF systems, the illumination driver hard switches one or more power switches (e.g., a power metal-oxide-semiconductor field effect transistor (MOSFET)) at a modulation signal frequency. The frequency of switching is typically in the tens to hundreds of MHz. At these frequencies, the gate capacitances of the power switches, which typically have a drain-to-source resistance when closed of a few milliohms, are relatively high and demand a relatively high amount of power (e.g., approximately 1 W). Conventional illumination drivers either directly drive the gate of the power switch or use a simple resonant circuit that uses the gate capacitance of the power switch and a single inductor. However, due to the high frequency of switching, directly driven drivers have high gate driving losses in the tens of MHz. Additionally, it is difficult to drive low drain-to-source resistance when closed switches at a tens to hundreds of MHz switching frequency. For simple resonant circuits, the gate capacitance is variable at each switch. Thus, it is difficult to utilize a single design across different devices. Furthermore, the gate capacitance changes as temperature changes. Thus, the switching frequency generated by the illumination driver can deviate from the desired frequency. Thus, there is a need for an illumination driver that reliably provides switching to a power switch at a frequency in the tens to hundreds of MHz to drive a light source in an optical TOF system.

In accordance with various examples, an optical TOF system is provided with an illumination driver that includes a resonant circuit with a resonant frequency that is unaffected by the gate capacitance of the power switch. The resonant circuit includes, in an embodiment, two inductors in a split configuration in series with a relatively low capacitance capacitor and the gate of the power switch. The resonant frequency of the circuit is determined based on the value of the inductance of the two inductors and the capacitance of the capacitor. By adding the series capacitor, the resonant frequency of the resonant circuit is unaffected by the gate capacitance of the power switch because the effective capacitance of the resonant circuit is equal to the capacitance of the series capacitor which does not vary across devices and is temperature invariant. Hence, the resonant frequency of the illumination driver can be reliably generated without the need to compensate for temperature and/or device variations.

To provide the necessary voltage to drive the gate of the power switch with a relatively low capacitance series capacitor while ensuring compatibility with complementary metal-oxide semiconductor (CMOS) design limitations, the combination of the split inductors can generate higher voltages (e.g., up to 50V) at the input of the series capacitor. Therefore, the illumination driver can generate a voltage that can open and close the power switch even in the presence of the relatively low capacitance series capacitor.

Figure 1:
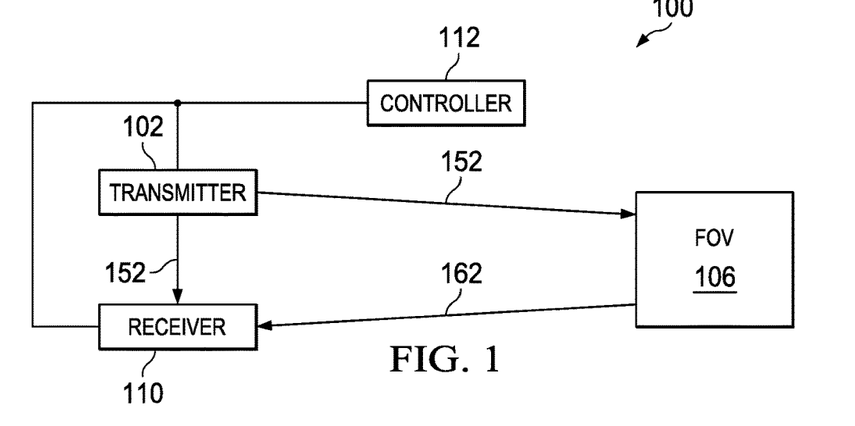
FIG. 1 shows an illustrative optical time of flight system in accordance with various examples.

FIG. 1 shows an illustrative optical TOF system 100 in accordance with various examples. In some embodiments, the optical TOF system 100 is a 3D TOF camera. However, the optical TOF system 100 can be any type of optical TOF system (e.g., point LIDAR, scanning LIDAR, etc.). The optical TOF system 100 includes a transmitter 102, receiver 110, and controller 112. The transmitter 102 is configured, by the controller 112, to generate one or more optical waveforms 152. The controller 112 can be implemented as a processor (e.g., a microcontroller, a general-purpose processor, etc.) that executes instructions retrieved from a storage device, or as dedicated hardware circuitry. In some embodiments, the optical waveform 152 is a single tone (e.g., a continuous wave) with amplitude modulation (e.g., a continuous amplitude modulated waveform).

The transmitter 102 is also configured, in an embodiment, to direct the optical waveform 152 toward the field of view (FOV) 106. In some embodiments, the transmitter 102 directs the optical waveform 152 toward the FOV 106 by directing the optical waveform 152 directly to the FOV 106. In other embodiments, the transmitter 102 directs the optical waveform 152 toward the FOV 106 by directing the optical waveform to a beam steering device (not shown) which then directs the optical waveform 152 to the FOV 106. In such embodiments, the beam steering device receives the optical waveform 152 from the transmitter 102 and steers the optical waveform 152 to the FOV 106. Thus, the transmitter 102 can direct the optical waveform 152 directly to the target object 106 or can direct the optical waveforms 152 to a beam steering device which directs the optical waveform 152 to the FOV 106.

The optical waveform 152 (or optical waveforms 152) reflects off of any objects located within the FOV 106 (i.e., target objects) and returns toward the receiver 110 as reflected optical waveform 162. The reflected optical waveform 162 is then received by the receiver 110. In some embodiments, an additional beam steering device (not shown) steers the reflected optical waveform 162 to the receiver 110. In some embodiments, the receiver 110 receives the reflected optical waveform 162 directly from the target object 106.

The receiver 110 is configured to receive the reflected optical waveform 162 and determine the distance to the target objects within FOV 106 based on the TOF from the transmitter 102 to the target object 106 and back to the receiver 110. For example, the speed of light is known, so the distance to the target objects is determined and/or estimated using the TOF. That is, the distance is estimated as d=c*TOF/2 where d is the distance to the target object, c is the speed of light, and TOF is the time of flight. The speed of light times the TOF is halved to account for the travel of the light pulse to, and from, the target object.

In some embodiments, the receiver 110, in addition to receiving the reflected optical waveform 162 reflected off of the target object 106, is also configured to receive the optical waveform 152, or a portion of the optical waveform 152, directly from the transmitter 102. The receiver 110, in an embodiment, is configured to convert the two optical signals into electrical signals, a received signal corresponding to the reflected optical waveform 162 and a reference signal corresponding to the optical waveform 152 received directly from the transmitter 102. The receiver 110 then, in an embodiment, performs a correlation function using the reference signal and the received signal. A peak in the correlation function corresponds to the time delay of the received reflected optical waveform 162 (i.e., the TOF). The distance then can be estimated using the formula discussed above. In other embodiments, a fast Fourier transform (FFT) can be performed on the received signal. A phase of the tone then is used to estimate the delay (i.e., TOF) in the received signal. The distance then can be estimated using the formula discussed above. In yet other embodiments, the in-phase (I) component is determined by correlating the received reflected optical waveform 162 with the transmitted optical waveform 152 received directly from the transmitter 102, and the quadrature (Q) component is determined by correlating the received reflected optical waveform 162 with a 90 degree phase shifted version of the transmitted optical waveform 152 received directly from the transmitter 102. The I/Q integrated charges are used to estimate the phase shift between the optical waveform 152 received directly from the transmitter 102 and the received reflected optical waveform 162. The distance then can be estimated using the formula discussed above.

Figure 2:
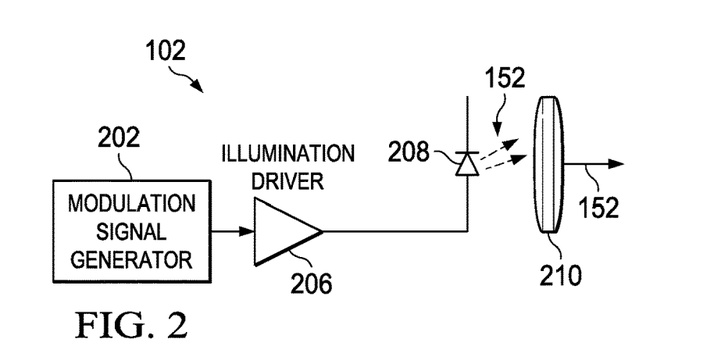
FIG. 2 shows an illustrative transmitter for an optical time of flight system in accordance with various examples.

FIG. 2 shows an illustrative transmitter 102 for optical TOF system 100 in accordance with various examples. The transmitter 102, in an embodiment, includes a modulation signal generator 202, an illumination driver 206, a light source 208, and an optics device 210. The modulation signal generator 202 is configured to generate a modulation signal (e.g., a modulation reference signal) and continuous waveforms using the modulation signal. For example, in some embodiments, the modulation signal generator 202 is configured to generate a single tone (i.e. continuous wave) modulation signal. The amplitude of the carrier signal, which in an embodiment is also generated by the modulation signal generator 202, is modulated with the modulation signal to generate a modulated carrier signal.

The illumination driver 206 generates a driving signal (regulates the current) to drive one or more optical transmitters, such as light source 208, so that the optical transmitter generates optical transmission signal 152 that corresponds with the modulated carrier signal generated by the modulation signal generator 202. In other words, the modulation signal modulates the intensity of the light transmitted by light source 208 during the pulse with the illumination driver 206 providing the driving current to the light source 208. The amplitude of the modulated carrier signal, and thus, the amplitude of the optical waveform 152 depends on and thus, corresponds with, the frequency of the modulation signal. While light source 208 is shown in FIG. 2 as a laser diode, any type of optical signal generator (e.g., a light emitting diode (LED)) can be utilized to generate the optical waveform 152. The optical device 210, which, in an embodiment is one or more lenses, is configured to direct (e.g., focus) the optical waveform 152 (e.g., the modulated light signal) toward the FOV 106.

Figure 3:
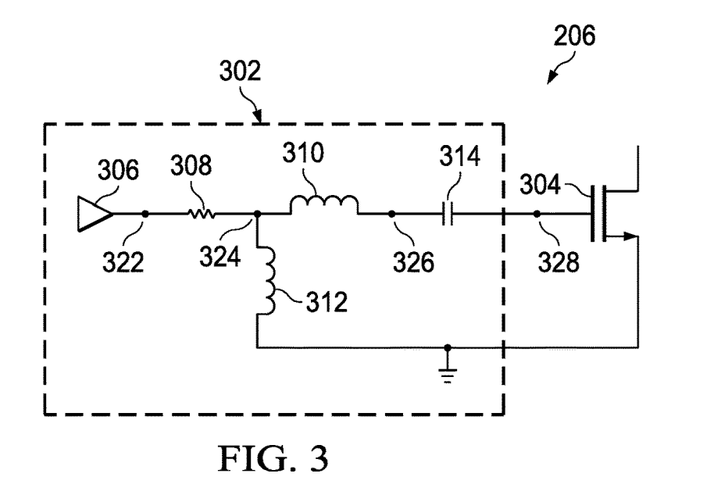
FIG. 3 shows an illustrative illumination driver for a transmitter for an optical time of flight system in accordance with various examples.

FIG. 3 shows an illustrative illumination driver 206 for transmitter 102 for optical TOF system 100 in accordance with various examples. The illumination driver 206, in an embodiment, includes a switch driver 302 and a switch 304. The switch driver 302 is configured to drive the gate of switch 304 with a voltage and/or current signal to open and close switch 304. In other words, the switch driver 302 generates a voltage and/or current that causes the switch 304 to enter an on state (the switch closes) and then a voltage and/or current that causes the switch 304 to enter an off state (the switch opens). More particularly, in an embodiment, the switch driver 302 generates a voltage that is greater than the threshold voltage of the switch 304 thereby closing the switch 304 (causing the switch 304 to enter the on state) alternating with generating a voltage that is less than the threshold voltage of the switch 304 thereby opening the switch 304 (causing the switch 304 to enter the off state).

In some embodiments, the switch 304 is configured to switch between the on state and the off state at a frequency in the tens of MHz up to 200 MHz. The switching of the switch 304, along with, in some embodiments, additional similar switches provides the drive current to drive the light source 208. More particularly, the amplitude modulation of optical signal 152 is determined by the switching frequency of the switch 304 which, in turn, corresponds with the carrier modulated signal generated by the modulation signal generator 202. In some embodiments, switch 302 is a power transistor. More particularly, the switch 304, in some embodiments, is a power n-type metal oxide semiconductor (NMOS) field-effect transistor. However, switch 304 can be any type of electrical switch, such as a p-type metal oxide semiconductor (PMOS) field-effect transistor, a binary junction transistor (BJT), etc.

The switch driver 302 includes, in an embodiment, a level shifter 306, a resistor 308, inductors 310-312, and capacitor 314. Level shifter 306 is configured to shift the low and high levels of a digital signal output from one part of a system to different low and high levels required by another part of the system. For example, one part of an electrical system may operate as 1.5V CMOS, where LOW (i.e., 0) is represented by a voltage between 0 and 0.1V and HIGH (i.e., 1) is represented by a voltage between 1.4V and 1.5V, while the illumination driver 208 operates as 5V CMOS, where LOW is represented by a voltage between 0 and 0.1V and HIGH is represented by a voltage between 4.9V and 5.0V. In other words, level shifter 306 is configured to shift the HIGH signal from being represented by a voltage between 1.4V and 1.5V to being represented by a voltage between 4.9V and 5.0V. Thus, the level shifter 306 acts as a current and/or voltage source for the switch driver 302.

The inductors 310-312 and capacitor 314 are configured as a resonant circuit with a resonant frequency that is approximately (i.e., plus or minus 10%) equal to the frequency of the modulation signal. Thus, the switch 304 switches between the on state and the off state at the modulation signal frequency, creating the desired amplitude modulation in the optical waveform 152. More particularly, the inductors 310 and 312 are in a split configuration. The capacitor 314 is in series with the inductors 310-312. For example, the inductor 310 includes a first end which is connected to a first end of the inductor 312 and a second end which is connected to the capacitor 314. In addition to being connected to inductor 310 at its first end, inductor 312 is connected at a second end to the source of switch 304. In addition to being connected to the second end of inductor 310, capacitor 314 is connected to the gate of switch 304.

In some embodiments, the capacitance of the capacitor 314 is less than the gate capacitance of the switch 304. For example, the capacitance of the capacitor 314 can be on the order of 50 pF while the gate capacitance of the switch 304 generally ranges from hundreds of pF to approximately 1 nF. Thus, the capacitance of the capacitor 314 is, in an embodiment, at least less than 10 times less than the gate capacitance of the switch 304. Hence, the combination of the capacitor 314 with the gate capacitance of the switch 304 acts as a capacitive divider with most of the voltage across the capacitor 314. Thus, the effective capacitance of the resonant circuit (switch driver 302) is equal to the capacitance of the capacitor 314.

As discussed above, conventional simple resonant circuit switch drivers use only the gate capacitance of the power switch to create the resonant circuit. However, the gate capacitance of the power switch varies across devices and even within the same switch as temperatures change. Thus, it is difficult to generate/maintain the desired resonant frequency, and thus, the desired switching frequency. By adding the series capacitor 314, the resonant frequency of the switch driver 302 is unaffected by the gate capacitance of the switch 304 because the effective capacitance of the resonant circuit is equal to the capacitance of the capacitor 314 which does not vary across devices and is temperature invariant. Hence, the resonant frequency of the switch driver 302 can be reliably generated without the need to compensate for temperature and/or device variations.

The gate threshold voltage of the switch 304 is, in an embodiment, approximately 5V. Because the series capacitor 314 is included in the switch driver 302, a relatively high voltage (e.g., 20V to 50V) is applied to the capacitor 314 to drive the gate of switch 304 at approximately 5V. However, output voltages in CMOS systems are typically limited to a maximum of 5V. Therefore, given the limitations of the available CMOS drive output voltages, the combination of inductors 310 and 312 ensures sufficient voltage at the gate of switch 304 while ensuring compatibility with the excitation circuit. In an embodiment, the inductance of inductor 312 is less than the inductance of inductor 310. Because the inductors 310-312 are in series, the combination of inductors 310-312 can generate higher voltages (e.g., up to 50V) at the input of capacitor 314. Therefore, the switch driver 302 can generate the 5V to switch the switch 304 between the on and off states. Additionally, in some embodiments, the direct current (DC) voltage at the gate of switch 304 is maintained by a high impedance voltage source (not shown) and a capacitor (not shown) is added in series with the switch driver 302 to avoid DC losses to the switch driver 302.

The illumination driver 206 has several advantages over conventional LC resonant drivers. For example, the series capacitance added by capacitor 314 may ensure that there is negligible or no frequency dependency on the gate capacitance of switch 304. Thus, there is negligible or no frequency variations from board to board. Additionally, without the capacitor 314, the inductance values for a 50 MHz switching frequency would be approximately 10 nH-20 nH which is low enough to make the illumination driver 206 susceptible to board and/or package parasitic inductance. However, with the inductors 310-312 and series capacitor 314, the inductance is, in some embodiments, 100 nH-200 nH which is high enough to make the illumination driver not susceptible to board and/or package parasitic inductance. Furthermore, a single design can be utilized for many different drivers instead of each driver having to be designed for the specific switch in that driver.

Moreover, the illumination driver 206 has several advantages over conventional direct switch drivers. For example, there are lower gate driving losses in the illumination driver 206. Additionally, it is possible to drive lower drain-to-source resistance switches which have higher gate capacitance with illumination driver 206. Furthermore, the power levels required by illumination driver 206 are much lower (e.g., 150 mW) than the conventional direct switch drivers (e.g., 1 W).

Figure 4:
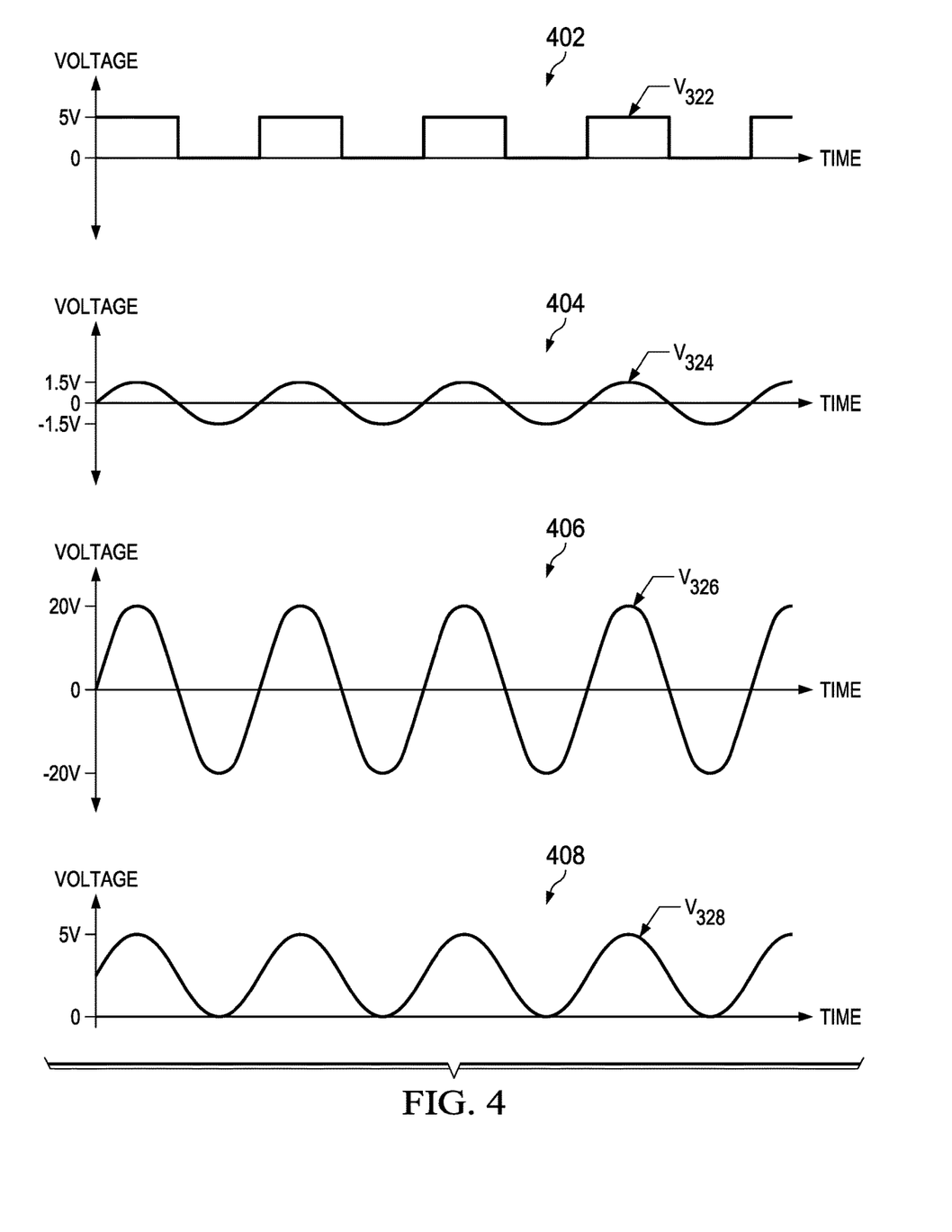
FIG. 4 shows multiple illustrative voltage versus time graphs at various nodes in an illumination driver for a transmitter for an optical time of flight system in accordance with various examples.

FIG. 4 shows multiple illustrative voltage versus time graphs 402-408 at various nodes 322-328, respectively, in illumination driver 206 for transmitter 102 for optical TOF system 100 in accordance with various examples. The graph 402 shows an example voltage versus time graph for the voltage level at the node 322 in FIG. 3 (labelled as $V_{322}$). As shown in graph 402, the voltage is, in an embodiment, level shifted by level shifter 306 to a 5V peak square waveform.

As shown in example graph 404, the voltage at node 324 (the node between the split inductors 310-312 and labelled as $V_{324}$), is a sine waveform created from the square waveform $V_{322}$ shown in graph 402. The waveform $V_{324}$ peaks at 1.5V and oscillates between −1.5V and 1.5V. As shown in example graph 406, the voltage at node 326 (the node between the inductor 310 and capacitor 314 and labelled as $V_{326}$), is a sine waveform created from the waveform $V_{324}$ shown in graph 404. The waveform $V_{326}$ peaks at 20V and oscillates between −20V and 20V. Thus, the inductors 310-312, as discussed above, are able to generate a relatively large voltage at the capacitor 314. As shown in example graph 408, the voltage at node 328 (the node between the capacitor 314 and the gate of the switch 304 and labelled as $V_{328}$), is a sine waveform created from the waveform $V_{326}$ shown in graph 406. The waveform $V_{328}$ peaks at 5V and oscillates between 0V and 5V. Thus, the inductors 310-312 and capacitor 314, as discussed above, are able to generate a gate drive voltage to open and close switch 304 at the resonant frequency which, in an embodiment, is approximately equal to the modulation signal frequency. In this way, the illumination driver 206 drives the light source 208 at a switching frequency which causes the light source 208 to generate the optical waveform 152 with the desired amplitude modulation.

Figure 5A:
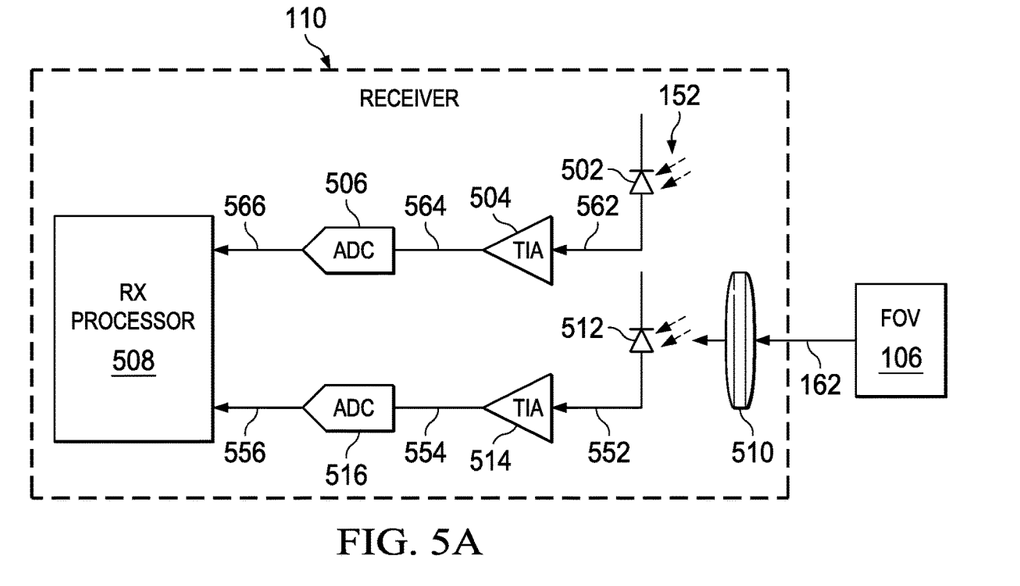
FIG. 5A shows an illustrative receiver for an optical time of flight system in accordance with various examples.

FIG. 5A shows an illustrative optical receiver 110 for optical TOF system 100 in accordance with various examples. The receiver 110 includes, in an embodiment, an optics device 510 (e.g., a lens), two photodiodes 502 and 512, two trans-impedance amplifiers (TIAs) 504 and 514, two analog-to-digital converters (ADCs) 506 and 516, and a receiver processor 508. As discussed above, in an embodiment, the reflected optical waveform 162 is received by the receiver 110 after reflecting off of target objects within the FOV 106. The optics device 510, in an embodiment, receives the reflected optical waveform 162. The optics device 510 directs (e.g., focuses) the reflected optical waveform 162 to the photodiode 512. The photodiode 512 is configured to receive the reflected optical waveform 162 and convert the reflected optical waveform 162 into a current received signal 552 (a current that is proportional to the intensity of the received reflected light). TIA 514 is configured to receive the current received signal 552 and convert the current received signal 552 into a voltage signal, designated as voltage received signal 554 that corresponds with the current received signal 552. ADC 516 is configured to receive the voltage received signal 554 and convert the voltage received signal 554 from an analog signal into a corresponding digital signal, designated as digital received signal 556. Additionally, in some embodiments, the current received signal 552 is filtered (e.g., band pass filtered) prior to being received by the TIA 514 and/or the voltage received signal 554 is filtered prior to being received by the ADC 516. In some embodiments, the voltage received signal 554 is received by a time to digital converter (TDC) (not shown) to provide a digital representation of the time that the voltage received signal 554 is received.

Photodiode 502, in an embodiment, receives the optical waveform 152, or a portion of the optical waveform 152, directly from the transmitter 102 and converts the optical waveform 152 into a current reference signal 562 (a current that is proportional to the intensity of the received light directly from transmitter 102). TIA 504 is configured to receive the current reference signal 562 and convert the current reference signal 562 into a voltage signal, designated as voltage reference signal 564 that corresponds with the current reference signal 562. ADC 506 is configured to receive the voltage reference signal 564 and convert the voltage reference signal 564 from an analog signal into a corresponding digital signal, designated as digital reference signal 566. Additionally, in some embodiments, the current reference signal 562 is filtered (e.g., band pass filtered) prior to being received by the TIA 504 and/or the voltage reference signal 564 is filtered prior to being received by the ADC 506. In some embodiments, the voltage reference signal 564 is received by a TDC (not shown) to provide a digital representation of the time that the voltage reference signal 564 is received.

The processor 508 is any type of processor, controller, microcontroller, and/or microprocessor with an architecture optimized for processing the digital received signal 556 and/or the digital reference signal 566. For example, the processor 508 can be a digital signal processor (DSP), a central processing unit (CPU), a reduced instruction set computing (RISC) core such as an advanced RISC machine (ARM) core, a mixed signal processor (MSP), etc. In some embodiments, the processor 508 is a part of the controller 112. The processor 508, in an embodiment, acts to demodulate the digital received signal 556 and the digital reference signal 566 based on the modulation signal generated by the modulation signal generator 202. In some embodiments, the processor 508 also receives the digital representation of the times that the voltage received signal 556 and the digital reference signal 566 were received. The processor 508 then determines, in an embodiment, the distance to target objects within the FOV 106 by, as discussed above, performing a correlation function using the reference signal and the received signal. A peak in the correlation function corresponds to the time delay of each received reflected optical waveform 162 (i.e., the TOF). The distance to the target object 106 can be estimated using the formula discussed above. In other embodiments, an FFT is performed on the received digital signal 556. A phase of the tone then is used to estimate the delay (i.e., TOF) in the received signals. The distance then can be estimated using the formula discussed above.

Figure 5B:
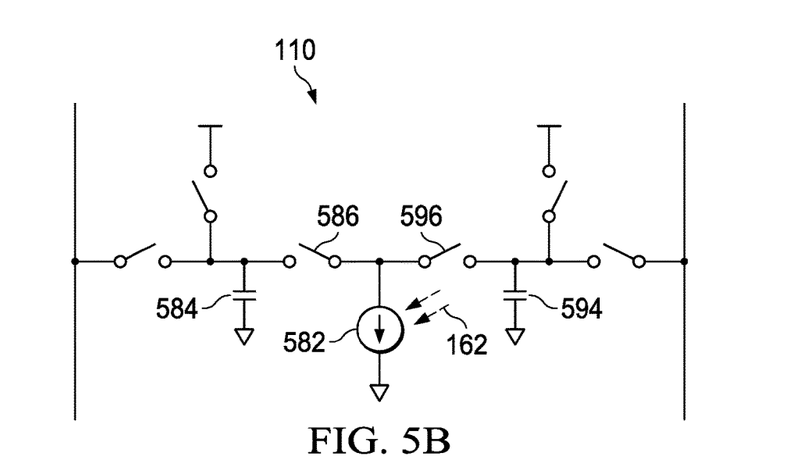
FIG. 5B shows an illustrative receiver for an optical time of flight system in accordance with various examples.

FIG. 5B shows another illustrative receiver 102 for optical TOF system 100 in accordance with various examples. The example receiver 102 shown in FIG. 5B is an I/Q receiver. The receiver 102 includes a photodiode 582, two switches 586 and 596, and two capacitors 584 and 594. The photodiode 582 receives the reflected optical waveform 162 from the target object 106 and converts the reflected optical waveform 162 into a current which is proportional to the amount of light being received by the photodiode 582. Because the amplitude of the reflected optical waveform 162 is being modulated, this current is representative of the amplitude modulation of the reflected optical waveform 162 and thus, the transmitted optical waveform 152. By closing switch 586, this current is integrated on capacitor 584. The capacitor 584 integrates the current and collects charge. The switch 586, in an embodiment, is opened and closed using the modulation signal generated by the modulation signal generator 202. This correlates the transmitted optical waveform 152 with the received reflected optical waveform 162. Thus, the charge on the capacitor 584 is effectively the correlation of the received reflected optical waveform 162 with the modulation signal. The switch 596 is closed using an orthogonal (90 degree phase shifted) version of the modulation signal (the quadrature phase). Thus, the capacitor 594 integrates the current and collects charge based on this quadrature phase of the modulation signal. This correlates the quadrature phase of the transmitted optical waveform 152 with the received reflected optical waveform 162. The charge on capacitors 584 and 594 represent the result of the correlation of the received reflected optical signal 162 with respect to the transmitted optical signal 152. This is then used to calculate the distance to the target object 106 as discussed above.

In other words, the I/Q receiver 110 shown in FIG. 5B converts the received reflected optical waveform 162 into an electrical received signal (e.g., a current). This electrical received signal is correlated with the modulated carrier signal generated by the modulation signal generator 202 (corresponding to the transmitted optical signal 152) to generate an I component. The electrical received signal is also correlated with a 90 degree phase shifted version of the modulated carrier signal to generate a Q component. The phase shift between the electrical received signal and the modulated carrier signal is estimated based on the I component and the Q component. This phase shift is converted into the distance to the target object as discussed above.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An optical transmitting system for distance measuring, comprising:
   a modulation signal generator configured to generate a modulation signal;
   a light source configured to generate an optical waveform with amplitude modulation corresponding with the modulation signal; and
   a resonant illumination driver coupled to the modulation signal generator and the light source, the resonant illumination driver configured to drive the light source, the resonant illumination driver including:
   a first inductor having a first terminal and a second terminal wherein the first inductor is configured to receive a drive current;
   a second inductor having a first terminal and a second terminal wherein the first terminal of the first inductor is directly coupled to the first terminal of the second inductor;
   a capacitor having a first terminal and a second terminal wherein the first terminal of the capacitor is directly coupled to the second terminal of the first inductor; and
   a transistor having a control terminal, a first current terminal and a second current terminal wherein the control terminal is directly coupled to the second terminal of the capacitor wherein the second terminal of the second inductor and the second current terminal of the transistor are coupled to ground.

2. The optical transmitting system of claim 1, wherein a capacitance of the capacitor is less than a gate capacitance of the transistor.

3. The optical transmitting system of claim 2, wherein the capacitance of the capacitor is at least ten times less than the gate capacitance of the transistor.

4. The optical transmitting system of claim 1, wherein an inductance of the second inductor is less than an inductance of the first inductor.

5. The optical transmitting system of claim 1, wherein the transistor is an n-type metal oxide semiconductor (NMOS) transistor.

6. A resonant illumination driver, comprising:
- a first inductor having a first terminal and a second terminal wherein the first inductor is configured to receive a drive current;
- a second inductor having a first terminal and a second terminal wherein the first terminal of the first inductor is directly coupled to the first terminal of the second inductor;
- a capacitor having a first terminal and a second terminal wherein the first terminal of the capacitor is directly coupled to the second terminal of the first inductor; and
- a transistor having a control terminal, a first current terminal and a second current terminal wherein the control terminal is directly coupled to the second terminal of the capacitor wherein the second terminal of the second inductor and the second current terminal of the transistor are coupled to ground.

7. The resonant illumination driver of claim 6, wherein the first and second inductors are configured to generate a voltage at the capacitor sufficient to drive a gate of the transistor to switch from the off state to the on state.

8. The resonant illumination driver of claim 6 wherein an inductance of the first inductor is greater than an inductance of the second inductor.

9. The resonant illumination driver of claim 6 wherein a gate capacitance of the transistor is greater than a capacitance of the capacitor.

10. A three dimensional (3D) time of flight (TOF) camera, comprising:
- a transmitter configured to generate an optical waveform with amplitude modulation corresponding with a frequency of a generated modulation signal, the transmitter including a resonant illumination driver configured to drive a light source that generates the optical waveform, the resonant illumination driver including:
  - a first inductor having a first terminal and a second terminal wherein the first inductor is configured to receive a drive current;
  - a second inductor having a first terminal and a second terminal wherein the first terminal of the first inductor is directly coupled to the first terminal of the second inductor;
  - a capacitor having a first terminal and a second terminal wherein the first terminal of the capacitor is directly coupled to the second terminal of the first inductor; and
  - a transistor having a control terminal, a first current terminal and a second current terminal wherein the control terminal is directly coupled to the second terminal of the capacitor wherein the second terminal of the second inductor and the second current terminal of the transistor are coupled to ground; and
- a receiver configured to receive the optical waveform reflected off of a target object and determine a distance to the target object based on a TOF from the transmitter to the target object and back to the receiver.

11. The 3D TOF camera of claim 10, wherein a capacitance of the capacitor is less than a gate capacitance of the transistor.

* * * * *